Jan. 28, 1969

W. C. WHITAKER ET AL 3,424,188

ANTISIPHON FAUCETS

Filed Oct. 10, 1967

INVENTORS
WATFORD C. WHITAKER
FRANK De MICHAEL
BY

Jan. 28, 1969 W. C. WHITAKER ET AL 3,424,188
ANTISIPHON FAUCETS

Filed Oct. 10, 1967 Sheet 2 of 2

INVENTORS
WATFORD C. WHITAKER
FRANK De MICHAEL
BY
Angus & Mon

United States Patent Office 3,424,188
Patented Jan. 28, 1969

---

3,424,188
ANTISIPHON FAUCETS
Watford C. Whitaker, 650 Auburn Ave., Sierra Madre, Calif. 91024, and Frank De Michael, 1335 Michillinda Ave., Pasadena, Calif. 91107
Filed Oct. 10, 1967, Ser. No. 674,170
U.S. Cl. 137—218　　　　　　　　　　　　　　3 Claims
Int. Cl. E03c 1/10

---

ABSTRACT OF THE DISCLOSURE

This disclosure relates to antisiphon faucets, and particularly to faucets, such as hose bibbs, having vacuum breakers integral with a valve.

Figure 1:
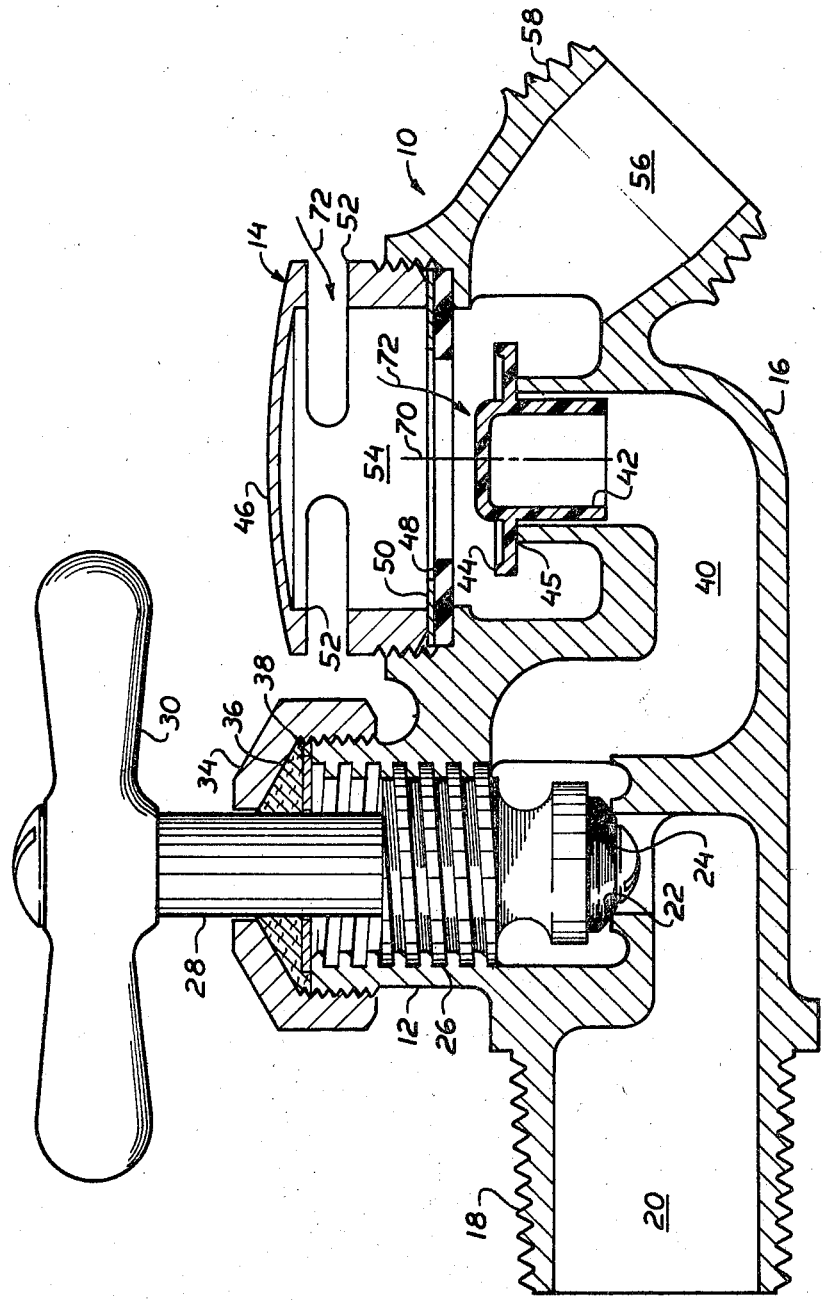

According to the present disclosure, a faucet such as a hose bibb is provided with valve means at the inlet side of the faucet for controlling flow of liquid through the faucet. An atmospheric vacuum breaker is mounted integral with the valve at the outlet portion of the faucet.

According to an optional and desirable feature of the present disclosure, the vacuum breaker includes means for preventing discharge of liquid through the outlet upon removal of the vacuum breaker from the faucet.

---

SPECIFICATION

This invention relates to antisiphon faucets, and particularly to faucets, such as hose bibbs, having vacuum breakers integral with a valve.

It is uniform practise to provide vacuum breakers, such as air gap devices, in discharge pipes to prevent waste water from being siphoned back into the supply water. Should a reduction of water pressure occur in a supply line, as may be occasioned by a rupture of a water main, contaminated water in the discharge pipe will not be siphoned back into the supply water because the air gap provided by the vacuum breaker breaks any vacuum that might occur in the discharge pipe.

However, there exist many situations where it is not practical to place a vacuum breaker in the discharge line. For example, valve faucets, such as hose bibbs, bibcocks, and the like are connected directly to the water supply line, and flexible water conduits, such as garden hoses, are often connected to the outlet of such valve faucets. It is well known that garden hoses are often used for a wide variety of purposes, many of which require the free end of the hose being placed in a sump of contaminated water. For example, the free end of a garden hose might be placed in a mud puddle while watering plants, or in a swimming pool while adjusting the pool water level.

It is not practical to place a vacuum breaker in a flexible hose to prevent siphoning of water through the hose to the supply line from a sump of contaminated water because there is no effective place to mount a vacuum breaker in a flexible hose.

It is an object of the present invention to provide a faucet with a unitary valve and vacuum breaker which will prevent siphoning of water into a supply line through the valve.

It is another object of the present invention to provide a hose bibb with a vacuum breaker to prevent siphoning of water into a supply line through the hose bibb.

According to the present invention, a faucet, such as a hose bibb, is provided with valve means at the inlet side of the faucet for controlling the flow of liquid through the faucet. An atmospheric vacuum breaker is mounted integral with the valve at the outlet portion of the faucet.

According to an optional and desirable feature of the present invention, if the vacuum breaker is removed from the faucet, the faucet is rendered inoperative. Thus, the vacuum breaker cannot be deliberately removed without rendering the entire faucet inoperative.

The present invention is particularly useful in connection with a hose bibb wherein a flexible hose is attached to the outlet of the faucet. The end of the hose opposite from that connected with the outlet of the faucet might be placed in a sump of contaminated water, such as a mud puddle or a swimming pool or the like. Should a fluctuation occur in the pressure in the supply line, the vacuum breaker associated with the valve on the faucet prevents water from being siphoned from the sump of contaminated water to the supply line.

Figure 2:
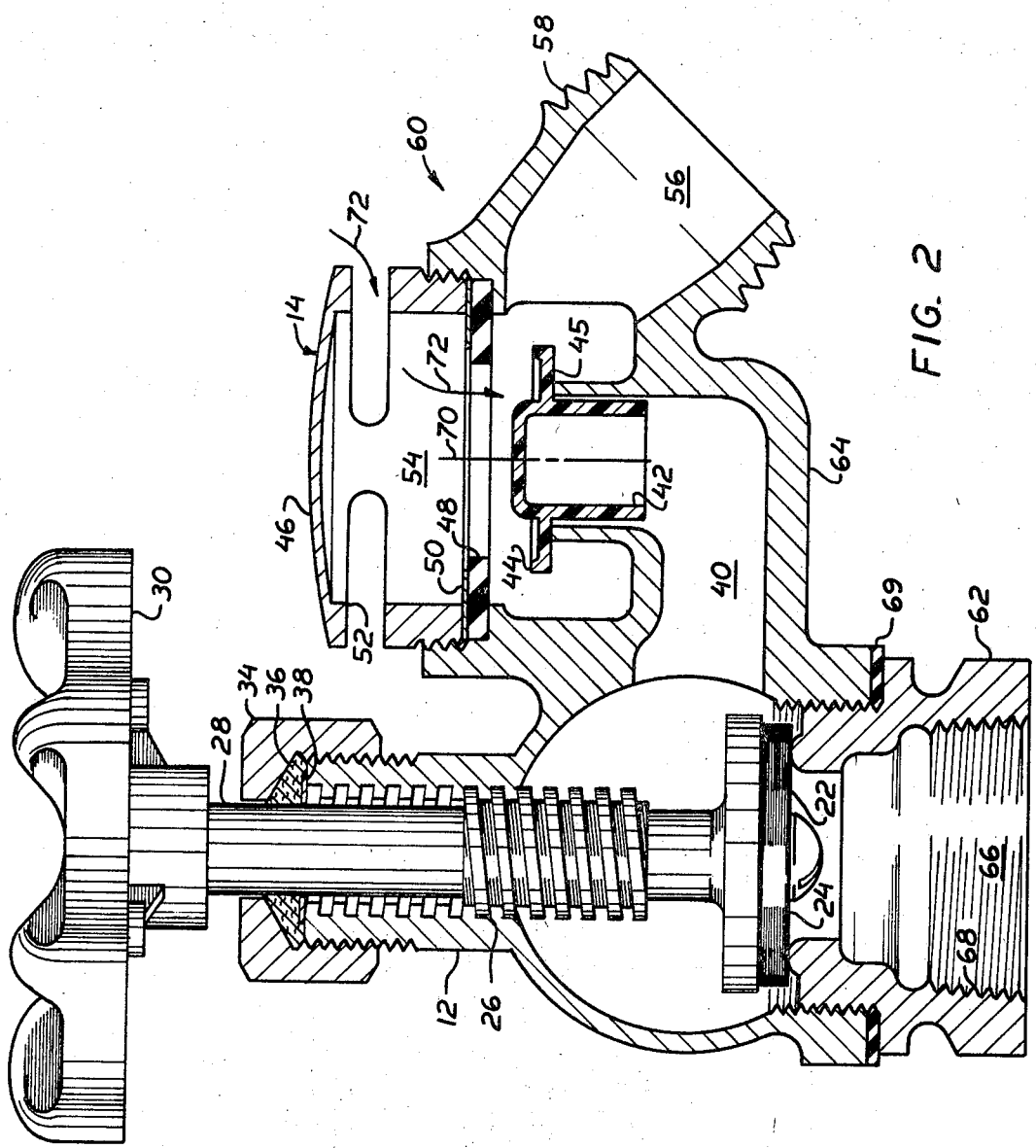

The above and other features of the present invention will be more fully understood from the following detailed description and the accompanying drawings, in which:

FIG. 1 is a side elevation, partly in cutaway cross-section, of a faucet according to the presently preferred embodiment of the present invention; and FIG. 2 is a side view elevation, partly in cutaway cross-section, of a modification of a faucet according to the present invention.

Referring to FIG. 1, there is illustrated a faucet 10 having a valve 12 and an atmospheric vacuum breaker 14. Faucet 10 which may, for example, be a hose bibb, includes housing 16 having threaded portion 18 adapted to be connected to a supply of pressurized water (not shown).

Inlet portion 20 is adapted to be in fluid communication with the supply line and delivers water under pressure from the supply line to valving wall 22 integral with housing 16. Valving element 24 is mounted to threaded portion 26 of valve stem 28 and is adapted to mate with valving wall 22. Handle 30 is mounted to valve stem 28 to enable rotation of the valve stem and valving element, thereby causing axial movement of these elements so as to permit opening and closing of valving element 24 against valving wall 22. Valve stem 28 passes through cap 34 which is threadably mounted to housing 16. Packing 36 is held in position between cap 34 and washer 38 and provides a fluid seal between valve stem 28 and the housing of the faucet. Packing 36 may be constructed of any suitable sealing material.

Passage 40 is formed within housing 16 at the downstream side of valving wall 22 and is in fluid communication with vacuum breaker 14. Vacuum breaker 14 comprises a preferably substantially cylindrical pop-up element 42 having radial shoulder 44 extending therefrom. Pop-up element 42 is preferably constructed from hard plastic. Shoulder 44 of pop-up element 42 is adapted to abut and rest on shoulder 45 of housing 16. Cap 46 is threadably mounted to housing 16 and retains washer 48 axially above pop-up element 42. The inside diameter of washer 48 is smaller than the outside diameter of shoulder 44 of the pop-up element so that a fluid seal is provided between washer 48 and shoulder 44 of the pop-up element when the pop-up element has moved to its uppermost position in abutment with washer 48. Preferably, washer 48 is constructed of neoprene rubber. Preferably, a metal washer 50 is retained by cap 46 above washer 48 to provide a firm backing for washer 48.

Vents 52 are formed in cap 46 and provide fluid communication between the atmosphere and cavity 54 within cap 46. Outlet portion 56 is provided in fluid communication with the outlet of the vacuum breaker. Preferably, outlet portion 56 includes threaded portion 58 so that a flexible hose or other suitable attachment may be attached thereto.

The faucet illustrated in FIG. 1 is particularly useful as a hose bibb and is attachable to a horizontally disposed supply line. FIG. 2 illustrates a modified hose bibb adapted to be connected to a vertically disposed supply line.

In FIG. 2 there is illustrated a faucet 60 having a valve 12 and vacuum breaker 14. The valve 12 and vacuum breaker 14 illustrated in FIG. 2 are substantially identical to the valve and vacuum breaker illustrated in FIG. 1, and like reference numerals designate similar portions of the valve and vacuum breaker. Adapter 62 is threaded to housing 64 of facuet 60 and provides inlet portion 66 in fluid communication with valving wall 22. Adapter 62 is provided with a threaded portion 68 for attachment to a standing supply line. Washer 69 provides a fluid seal between the adapter and housing 64.

In operation of the facuet according to this invention, when valve 12 is moved to an open position to provide fluid communication between a supply line through the inlet portion of the faucet, pressure-operated pop-up element 42 is moved upwardly along axis 70 due to the pressure of the supply water behind it until it abuts and seals with washer 48. Water is thus permitted to flow from the supply line through the facuet to the outlet portion 56 and the vacuum breaker 14 is closed to the atmosphere due to the fluid seal between the pop-up element and washer 48. Water will not leak past the seal between the pop-up element and washer 48. However should a reduction of pressure occur within the supply line so that the pressure in the faucet is less than atmospheric pressure, pop-up element 42 moves downwardly due to atmospheric pressure exerted on the pop-up element and air is permitted to flow in the direction of arrows 72 into the faucet. In this manner, vacuum breaker 14 breaks the vacuum or reduced pressure occurring in the supply line, and prevents siphoning of water from the outlet back to the supply line through the valve and faucet.

If a flexible hose (not shown) is connected to the outlet portion of the faucet, for example by being attached to threaded portion 58 of the faucet, and if the free end of such flexible hose is in fluid communication with a sump of contaminated water, such as a mud puddle or swimming pool, contaminated water cannot be siphoned through the hose to the supply water due to a vacuum in the faucet because of the air gap provided by the vacuum breaker.

One optional but desirable feature of this invention resides in the fact that the faucet is rendered inoperative if the vacuum breaker is removed. If cap 46 is removed from the vacuum breaker, water pressure behind pop-up element 42 will cause expulsion of the pop-up element and washers 48 and 50. If this occurs, water is directed out through the opening provided by the removed cap 46, and little if any water is discharged to outlet 56. Thus, without the vacuum breaker, the faucet is rendered inoperative.

The present invention thus provides a faucet having an integral valve and vacuum breaker unit to prevent siphoning of water from the outlet of the faucet to the supply line of the faucet. The device is simple to construct and is easily installed. Furthermore, the device is reliable and does not require the intricate adjustments heretofore required with prior art devices.

This invention is not to be limited by the embodiment shown in the drawings and described in the description, which are given by way of example and not of limitation, but only in accordance with the scope of the appended claims.

What is claimed:

1. An antisiphon faucet comprising: a housing having an inlet adapted to be connected to a source of pressurized liquid and an outlet through which liquid is to be discharged; retaining means supported by said housing adjacent said outlet for attaching a flexible hose thereto; valving means mounted to said housing between said inlet and said outlet, said valving means being adapted to close fluid communication between said inlet and said outlet; and a vacuum breaker mounted to said housing in fluid communication with said valving means and said outlet, said vacuum breaker including a vent cap having a cylindrical skirt portion, said skirt portion having an internal diameter, said skirt portion being threadably assembled to an internally threaded opening in said housing, a vent through said vent cap providing fluid communication to the atmosphere, a first shoulder integral with said housing adjacent said vent cap and below said threaded opening, annular resilient seal means supported by said first shoulder, an annular rigid backing means supported by said seal means, said seal means and said backing means having a diameter which is less than the diameter of said threaded opening, said seal means and said backing means being sandwiched between said vent cap and said first shoulder when said vent cap is assembled to said threaded opening, port means through said seal means and said backing means, said port means having a diameter which is less than the internal diameter of said skirt portion, said port means being adapted to provide fluid communication between said vent and said valving means and said outlet, said port means having an axis, an annular valve seat integrally formed in said housing adjacent said first shoulder and axially disposed below said port means, said valve seat being in fluid communication with said valving means, the diameter of said port means being greater than the diameter of said valve seat, a freely-movable unitary plastic pop-up element having an annular second shoulder and a cylindrical depending portion integral therewith, said depending portion having a diameter smaller than the diameter of said valve seat, said second shoulder having a diameter greater than said valve seat and greater than said port means but smaller than the internal diameter of said skirt portion and smaller than said threaded opening, said pop-up element being movable by the pressure of liquid passed by said valving means to a first position wherein said second shoulder seals against said seal means thereby closing said port means, and being movable by atmospheric pressure to a second position wherein said second shoulder seals against said valve seat thereby closing fluid communication between said valve seat and said outlet, said backing means providing substantial deformation of said seal means by said pop-up element, said depending portion being in registration within said valve port for all positions of said pop-up element, a cavity in said depending portion, said cavity being in fluid communication with said valving means, said depending portion providing the only guidance for the pop-up element as said pop-up element moves between its first and second positions, said second shoulder being so disposed and arranged as to direct liquid discharged through said valve seat towards said outlet when said pop-up element is in any position other than its second position, thereby substantially preventing liquid from escaping through said vent, whereby said vacuum breaker provides an atmospheric air gap to break a vacuum occurring between said valving means and said outlet, thereby preventing siphoning of liquid from said outlet to said valving means, and fluid passing through said valving means lubricates the depending portion of the pop-up element, and whereby disassembly of said vent cap from said threaded opening and opening said valving means causes axial discharge of the pop-up element, the backing means, and the seal means through the threaded opening thereby permitting liquid to be axially discharged through said threaded opening to substantially prevent discharge of liquid through said outlet.

2. A faucet according to claim 1 further including means supported by said housing adjacent said inlet for attaching said housing to a horizontal pipe containing pressurized liquid.

3. A faucet according to claim 1 further including means supported adjacent said inlet by said housing for attaching said housing to a vertical pipe containing pressurized liquid.

(References on following page)

References Cited

UNITED STATES PATENTS

| | | | |
|---|---|---|---|
| 2,282,188 | 5/1942 | Horne | 137—218 |
| 2,590,386 | 3/1952 | Dobrick | 137—218 |
| 2,927,598 | 3/1960 | Thompson | 137—218 |
| 3,155,107 | 11/1964 | Woodford | 137—218 |
| 3,158,170 | 11/1964 | Tubbs | 137—218 |
| 3,180,352 | 4/1965 | Kersten et al. | 137—218 |
| 3,189,037 | 6/1965 | Callejo | 137—218 |

WILLIAM F. O'DEA, *Primary Examiner.*

D. H. LAMBERT, *Assistant Examiner.*